Aug. 24, 1926.
C. R. MORTON
1,597,282
VARIABLE SPEED TRANSMISSION
Filed April 26, 1923    4 Sheets-Sheet 4
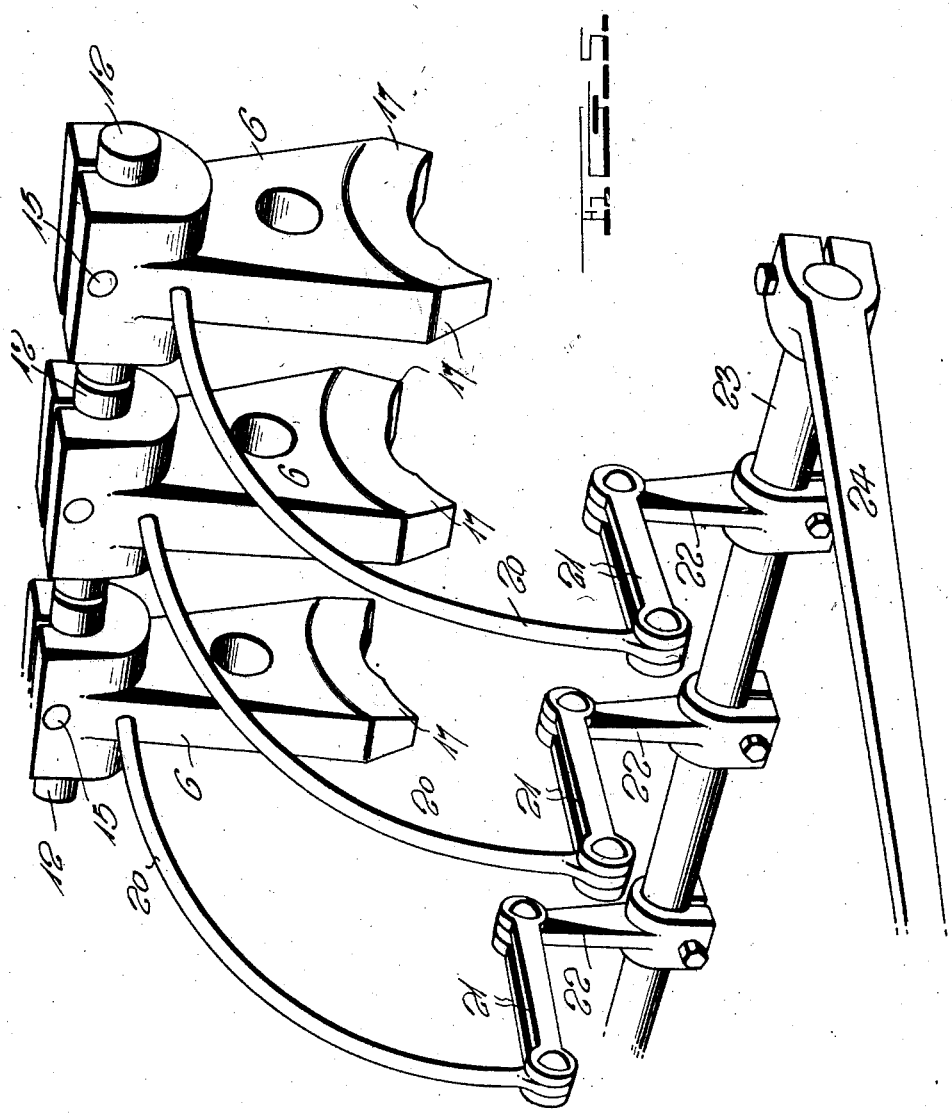
Inventor
C. R. MORTON
Witness
H. Woodard
By H. B. Willson Yeo
Attorneys Patented Aug. 24, 1926.

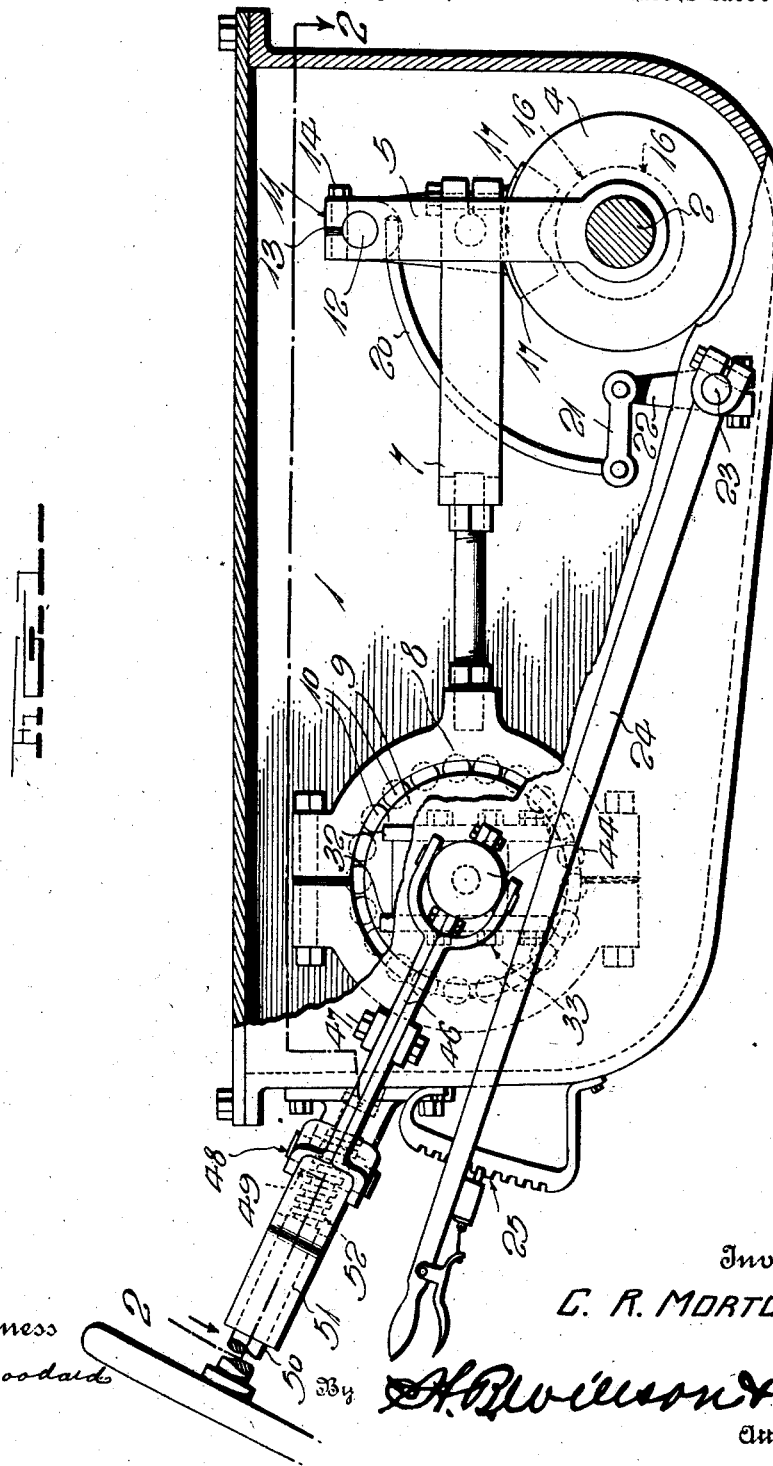

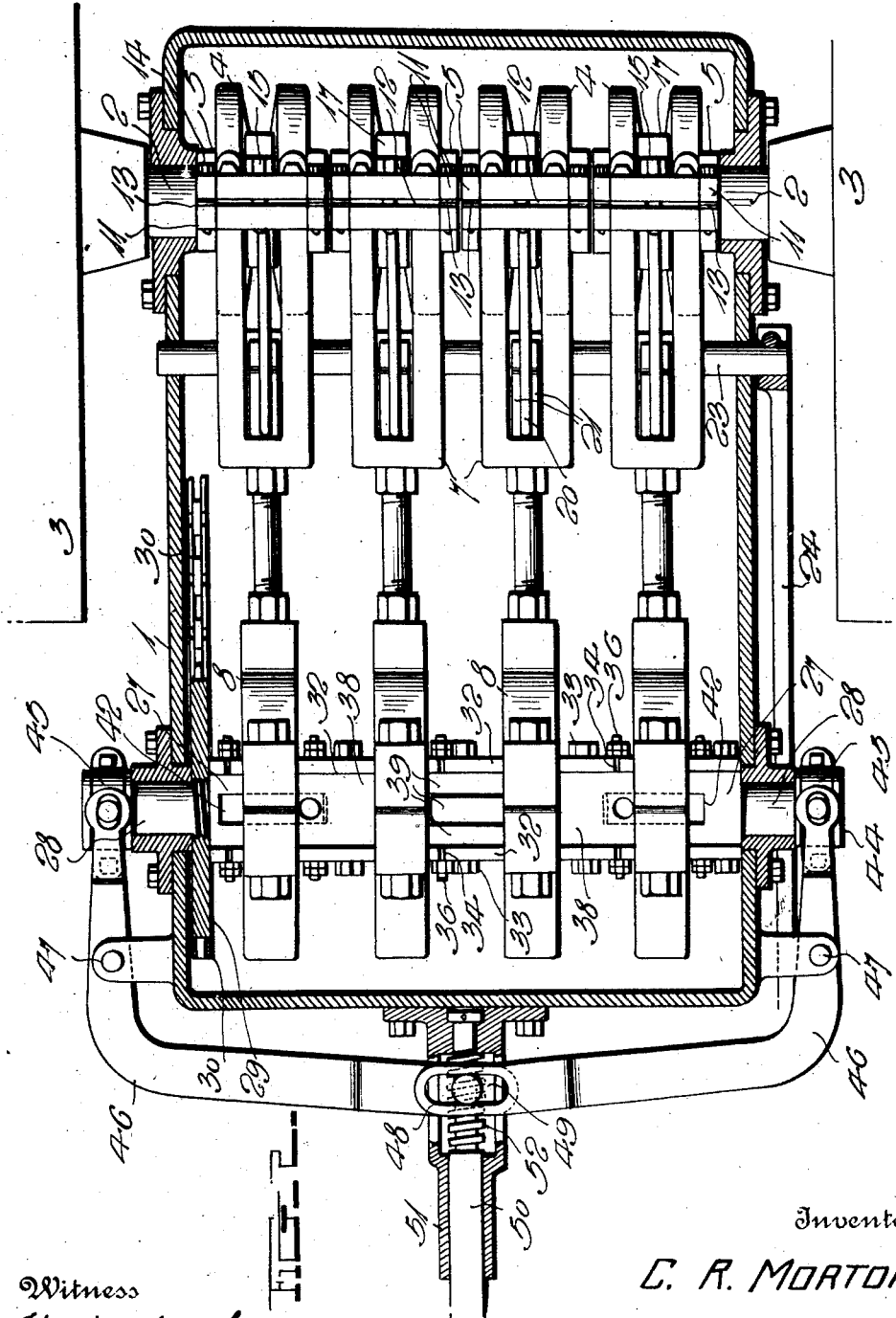

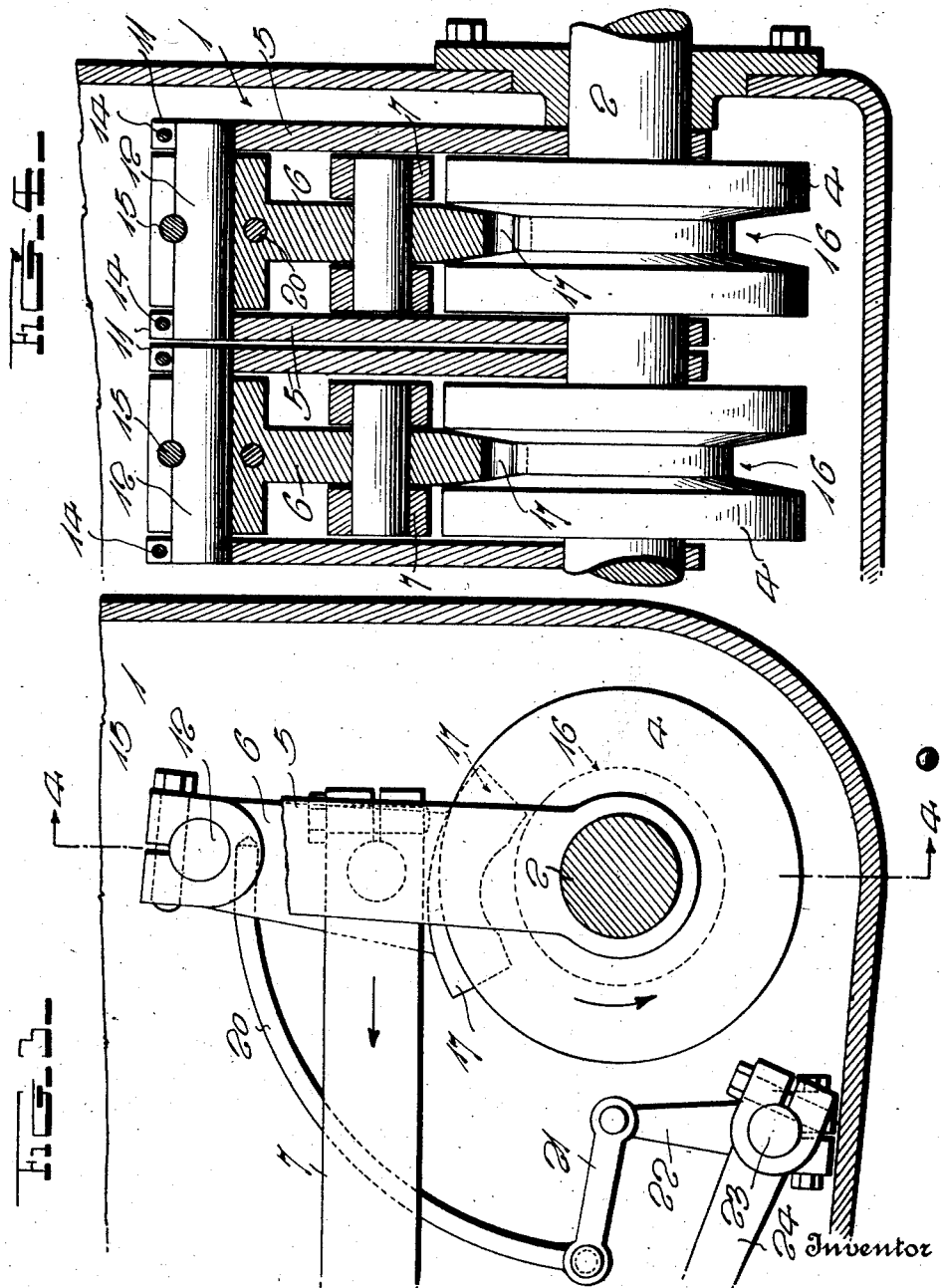

1,597,282

UNITED STATES PATENT OFFICE.

CHARLES E. MORTON, OF HARRISBURG, PENNSYLVANIA.

VARIABLE-SPEED TRANSMISSION.

Application filed April 26, 1923. Serial No. 634,883.

My invention relates to improvements in transmission mechanisms of the type employing a plurality of intermittent grip devices and means for oscillating them to rotate a drive shaft, the invention being primarily designed for use upon motor driven vehicles, although not limited to this particular field.

The principal object of the invention is to provide an improved form of intermittent grip device which, though simple and inexpensive, will be absolutely positive in operation and may be manually adjusted to an inoperative condition whenever desired.

A further object of the invention is to make novel provision whereby the intermittent grip device may be made to drive the shaft either forwardly or rearwardly.

In the construction of the intermittent grip device, an oscillatory dog-carrier is mounted concentric with a shaft driving drum, a drum-engaging dog is pivoted to said carrier at a point spaced outwardly from the drum and the inner end of said dog is arranged to operatively engage the drum. Means are provided for oscillating the dog and the dog-carrier, and a further aim of the invention is to connect the oscillating means in such a manner that it will act directly on the dog to force a binding frictional engagement of said dog with the drum when said oscillating means strokes in one direction, but will release engagement of the dog and drum upon stroking in the other direction.

Yet another aim is to provide unique spring means connected with the dog for shifting it to operative or inoperative positions at the will of the operator.

Another object in connection with the adjustable eccentrics, is to provide means for holding these eccentrics in properly spaced relation upon their carrying shaft and to provide for taking up wear which would otherwise permit lateral shifting of said eccentrics.

In the accompanying drawings forming a part of this specification and in which like numerals are employed to designate like parts throughout the same:—

Figure 1 is a side elevation partly in section of a transmission mechanism constructed in accordance with my invention.

Figure 2 is a horizontal sectional view as indicated by the broken line 2—2 of Fig. 1.

Figure 3 is an enlarged sectional view partly in elevation showing one of the intermittent grip devices and associated parts.

Figure 4 is a transverse section on line 4—4 of Fig. 3.

Figure 5 is a perspective view of several of the gripping dogs and their adjusting means.

In disclosing my invention I have illustrated all moving parts within an oil-tight casing 1 which is intended in most instances to be mounted upon the chassis of some sort of a motor vehicle, although as above stated, the invention is not restricted to this particular use. Two axially alined shaft sections 2 extend across one end of the casing 1 and as here shown, are provided at their outer ends with traction wheels 3. Since relative rotation of the wheels 3 is necessary when steering, the shaft sections 2 are of course mounted in any suitable manner so that they too may turn relatively. Mounted upon each shaft section 2, is a plurality (preferably two) of drums 4 and at each side of each drum, I have shown a dog-carrier 5, a drum-driving friction dog 6 being provided for each drum and having suitable pivotal connection with the adjacent carriers. Pivoted to each dog 6 is a suitable pitman rod 7, the several rods being provided with eccentric straps 8 within which eccentrics 9 are mounted, roller bearings 10 being preferably interposed between the two. By means forming no part of the present invention, the eccentrics 9 may be set concentrically with their carrying shaft or their throw may be varied, so that the stroking of the pitman rods 7 may be arrested at will or lengthened and shortened, as occasions may require. When the stroking of the pitman rods 7 is short, the intermittent grip devices 4—5—6, will rotate the shaft section 2 only a slight amount upon each stroke and consequently slow speed will be produced, but as the throw of the eccentrics is increased, the stroking of the intermittent grip devices is increased and consequently higher speed is obtained from the shaft sections 2.

In the preferred form of the construction, each dog-carrier 5 is in the form of a radial arm mounted at one end on the shaft section 2 and free to swing upon the same, said arm extending beyond the drum 4. The outer ends of each pair of arms or carriers 5 are provided with suitable bearings 11 rockably receiving the ends of a pin 12, any suitable provision such as shims 13 and screws 14, being made for taking up wear in the bearings. Each pin 12 carries one of the friction dogs 6, the latter being clamped around the pin, between the carrying arms 5, by means of an appropriate bolt 15. While in some instances, it might be possible to have the inner end of the dog 6 engage a smooth peripheral surface of the drum 4, I prefer to provide said drum with a circumferential groove 16 whose side walls converge toward the center of the drum. The inner end of the dog 6 is of wedge-shape and when the intermittent grip device is intended for driving the shaft section 2 either forwardly or rearwardly, said inner end of the dog is provided with a pair of wedge-shaped shoes 17 which are both received in the groove 16. One of these shoes is offset forwardly from an imaginary line connecting the axis of the shaft section 2 with the pivot pin 12 of the dog 6, while the other shoe is rearwardly offset from this line, and both of said shoes are of such dimensions that when the arm 6 is in a neutral position between the carrying arms 5, the dogs will not frictionally engage the drum. This relation is illustrated in Fig. 1. By means yet to be described however adjustment of the intermittent grip device may be effected so that the dog 6 assumes an angular relation with respect to its carrying arms 5, thereby initially wedging one of the shoes 17 into the groove 16 as shown for instance in Fig. 3. It thus follows that when the pitman rod 7 strokes in one direction, this wedging action is increased to such an extent that the dog positively grips the drum 4 and rotates the same. Upon the return stroke of the pitman however, the canting means for the dog yields and thus the frictional engagement of the dog with the drum is released to allow return motion of the dog and its carriers, in readiness to again grip the drum. Figure 3 shows the intermittent grip device set for driving the drum 4 counterclockwise, the dog 6 being thrown to the left so that the right-hand shoe 17 is operating each time the pitman rod 7 moves to the left as indicated by the arrow upon said rod. It will be observed that the connection of the pitman rod 7 directly with the dog 6 has a tendency to continually swing the latter upon its pivot pin 12, thereby positively wedging the active shoe 17 into the groove 16 upon each working stroke of the device, so that there is no chance whatever of slippage. The moment the return stroke of the pitman rod starts however, this frictional or wedging engagement is released so that the intermittent grip device may move idly around the drum. To set the device for driving the drum 4 in a clockwise direction, it is simply necessary to make such an adjustment as to swing the dog 6 to the right instead of to the left, whereupon the previously active shoe 17 will be entirely relieved of operation and the other shoe 17 will come into play.

For adjusting the several dogs 6 in the manner above defined, any suitable spring means may of course be used. I prefer however as shown most clearly in Figs. 1, 3 and 5, to provide each dog with a spring arm 20 which is rigidly secured thereto in any suitable manner and extends to a point substantially 90 degrees around the drum from the dog, being in spaced relation with said drum however as clearly shown. Connected with the free ends of the arms 20, is appropriate means for springing said arms either toward or from the drums 4 and thus the dogs 6 may be made to operate for either forward or rearward driving. In the preferred form of my invention, I connect horizontal links 21 with the free ends of the arms 20 and in turn connect said links with crank arms 22 on a control shaft 23 extending across the casing 1, one end of said shaft being provided with a suitable hand lever 24 by means of which it may be thrown in either direction. Any preferred means such as a common dog and rack 25 may be used for holding the lever 24 in any position at which it may be set.

The eccentrics 9 may be mounted and driven in any desired manner. In the present showing, they are carried by a shaft 27 having journals 28 mounted in appropriate bearings in opposite sides of the casing 1, and a sprocket 29 and chain 30 are shown as driving means for the shaft. Parts designated by reference characters 32 to 52, designate details of eccentric mounting and adjusting means forming no parts of the present invention, claims to such mounting and adjusting means having been removed due to requirement for division.

Since excellent results may be obtained from the details disclosed, they are preferably followed, but within the scope of the invention as claimed, numerous minor changes may of course be made.

I claim:—

1. An intermittent grip mechanism comprising a drum, an oscillating dog-carrier concentric with said drum, a friction dog pivoted to said dog-carrier at a point spaced outwardly from said drum and having its inner end positioned to engage said drum, means for swinging said dog to either an operative or an inoperative position, and an operating member pivoted to said dog between the pivot of the latter and its drum-engaging end for alternately moving said dog and said carrier in opposite directions.

2. An intermittent grip mechanism comprising a drum having a V-shaped peripheral groove, an oscillatory dog-carrier concentric with said drum, a dog pivoted to said carrier at a point spaced outwardly from said drum, the inner end of said dog having a wedge-shaped shoe offset circumferentially of said drum from a line connecting the drum axis with the pivotal axis of the dog, said shoe being within said groove, yielding means connected to said dog for moving it to operative or inoperative position, and means connected to said dog for alternately moving it and said carrier in opposite directions.

3. An intermittent grip mechanism comprising a drum having a V-shaped peripheral groove, an oscillatory dog-carrier concentric with said drum, a dog pivoted to said carrier at a point spaced outwardly from said drum, the inner end of said dog having wedge-shaped drum-engaging shoes at opposite sides of a radial line from the drum axis to the pivotal axis of the dog, said shoes being received within said groove, yielding means connected to said dog for swinging it in either direction into operative relation with the drum, and means connected to said dog for alternately moving it and said carrier in opposite directions.

4. In an intermittent grip mechanism, a shaft having a drum, a radial arm free to swing on said shaft adjacent said drum, a friction dog pivoted to said arm and having its inner end positioned for contact with said drum, an operating member connected with said dog for moving the latter and said arm alternately in opposite directions, and yielding means connected with said dog for throwing the same to either an operative or an inoperative position with respect to said drum.

5. An intermittent grip mechanism comprising a drum, an oscillatory dog-carrier concentric with said drum, a friction dog pivoted to said carrier at a point spaced outwardly from said drum, said dog being co-operable with said drum for driving the latter, means for bodily oscillating said dog and said carrier, and setting means for said dog comprising a spring arm rigidly secured to said dog and extending therefrom approximately ninety degrees around the drum but in spaced relation with the latter, and means for springing the free end of said spring arm transversely of the drum axis and for permitting oscillatory movement of said spring arm with the dog.

6. An intermittent grip mechanism comprising a drum, an oscillatory dog-carrier concentric with said drum, a friction dog pivoted to said carrier at a point spaced outwardly from said drum, said dog being co-operable with said drum for driving the latter, means for bodily oscillating said dog and said carrier, and setting means for said dog comprising a spring arm rigidly secured to said dog and extending therefrom approximately ninety degrees around the drum but in spaced relation with the latter, a link pivoted to the free end of said spring arm and positioned approximately on a line radiating from the drum axis, and a movable control member to which said link is pivoted for moving the same transversely of the drum axis.

In testimony whereof I have hereunto set my hand.

CHARLES R. MORTON.